United States Patent [19]

Houben et al.

[11] Patent Number: 4,831,917
[45] Date of Patent: May 23, 1989

[54] MULTIPLE PIECE PISTON FOR AN INTERNAL COMBUSTION ENGINE

[75] Inventors: Hans Houben, Wuerselen; Eckhard Haas, Cologne, both of Fed. Rep. of Germany

[73] Assignee: Kloeckner-Humboldt Deutz AG, Fed. Rep. of Germany

[21] Appl. No.: 76,575

[22] Filed: Jul. 22, 1987

[30] Foreign Application Priority Data

Jul. 28, 1986 [DE] Fed. Rep. of Germany ....... 3625492

[51] Int. Cl.⁴ .............................................. F01B 31/08
[52] U.S. Cl. ...................................... 92/176; 92/186; 123/193 P
[58] Field of Search ..................... 92/82, 87, 108, 128, 92/141, 144, 153, 158, 159, 174, 176, 181, 186, 213, 216, 220, 221, 255; 123/193 P, 865

[56] References Cited

U.S. PATENT DOCUMENTS

| | | | |
|---|---|---|---|
| 3,385,175 | 5/1968 | Meier et al. | 92/176 |
| 3,915,141 | 10/1975 | Öttl et al. | 123/193 P |
| 4,372,194 | 2/1983 | Vallaude | 92/176 |
| 4,375,782 | 3/1983 | Schieber | 123/193 P |
| 4,651,629 | 3/1987 | Castarede | 92/176 |

FOREIGN PATENT DOCUMENTS

| | | | |
|---|---|---|---|
| 0125178 | 11/1984 | European Pat. Off. | 123/193 P |
| 2351166 | 10/1973 | Fed. Rep. of Germany | 123/193 P |
| 2357569 | 5/1975 | Fed. Rep. of Germany | 123/193 P |
| 2546388 | 4/1977 | Fed. Rep. of Germany | 123/193 P |
| 2558763 | 7/1977 | Fed. Rep. of Germany | 123/193 P |
| 3032671 | 3/1982 | Fed. Rep. of Germany | 123/193 P |
| 3240224 | 3/1984 | Fed. Rep. of Germany | 123/193 P |
| 3303984 | 5/1984 | Fed. Rep. of Germany | 123/193 P |
| 0085342 | 5/1983 | Japan | 123/193 P |

Primary Examiner—Robert E. Garrett
Assistant Examiner—Thomas Denion
Attorney, Agent, or Firm—Charles L. Schwab

[57] ABSTRACT

A multiple piece piston is provided for a diesel internal combustion engine having a combustion chamber depression in the crown of the piston. In order to achieve a low rate of heat flow into the piston ring area and thus into the cylinder liner which surrounds the piston, a separate piston base or crown surrounding the combustion chamber depression is formed by a ring element made of a material having poor thermal conductivity, and the main body of the piston is made of a material with high thermal conductivity. The heat of combustion is thus conducted mainly axially through the piston main body and absorbed by sprayed cooling oil. The cooling oil, thus heated, can be utilized for heating purposes.

6 Claims, 1 Drawing Sheet

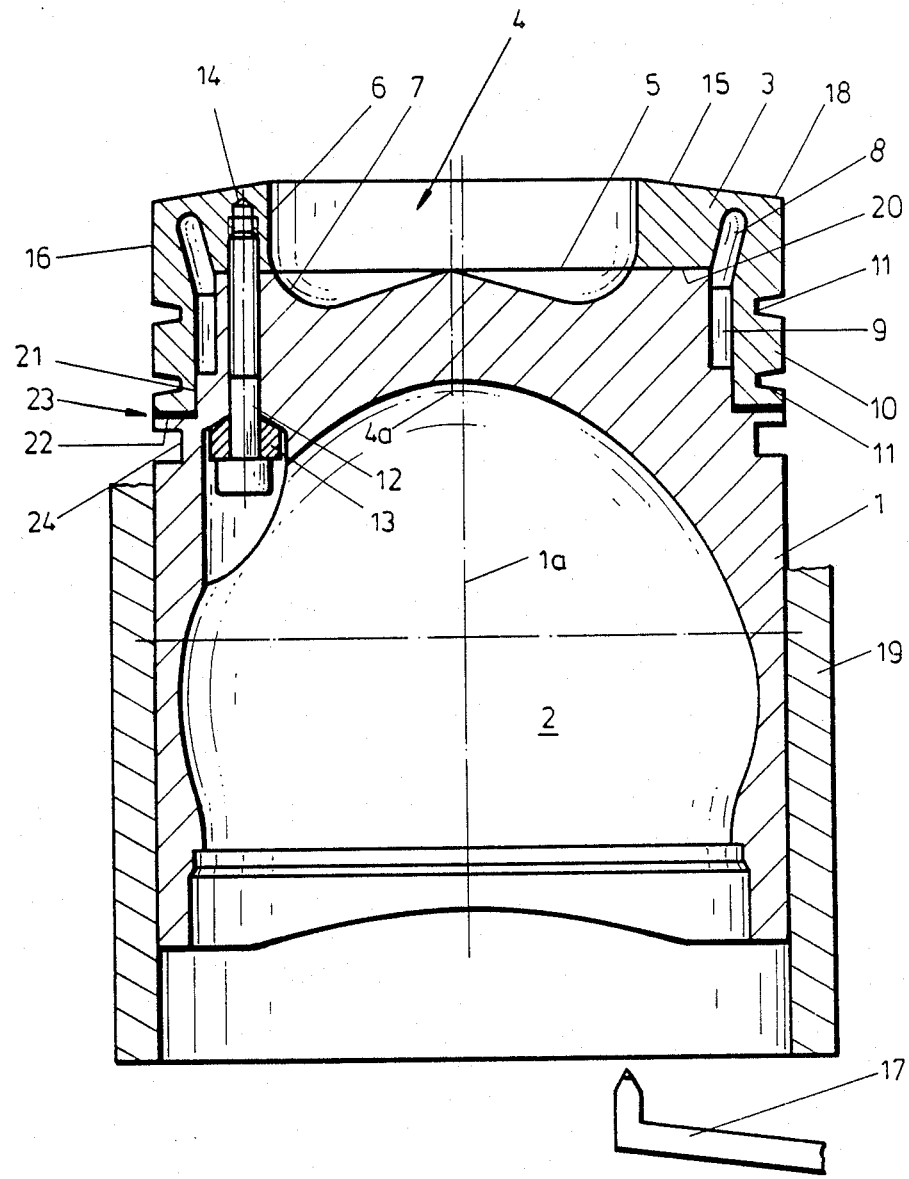

MULTIPLE PIECE PISTON FOR AN INTERNAL COMBUSTION ENGINE

TECHNICAL FIELD

This invention relates to a multiple piece piston for an internal combustion engine wherein a ring element secured to the piston main body forms the side wall of a combustion chamber depression in the crown of the piston.

PRIOR ART STATEMENT

A multiple piece piston is shown in DD-PS 123 962. In order to retard the thermal flow to the piston ring area, the piston has a ring element which forms the fire wall and the ring support area which can be fabricated from a selected material. A cooling chamber is provided between the ring element and the piston main body, which is bathed continuously in cooling oil. The thermal flow into the ring support area can hereby be influenced by the flow of coolant through the cooling chamber, whereby the temperature of the ring element can be maintained at an acceptable level. This known piston can be used with fluid-cooled internal combustion engines as well as with internal combustion engines which have an air-cooled head and a fluid-cooled piston.

OBJECTS AND BRIEF SUMMARY OF THE INVENTION

When using internal combustion engines with air-cooled heads and fluid-cooled pistons it is necessary to remove an increased amount of heat from the area of the piston rings in order to not subject the cylinder liner to excessively high temperatures. If in operation of engines of this type a large part of the combustion heat is released via the ribbed cylinder head into the cooling air, a correspondingly small part of the heat will be absorbed by the cooling oil and it will be at a relatively low temperature level. This results in, on the one hand, a relatively long heat-up phase, and, on the other hand, in a cooling oil with so little thermal energy it is ineffective when used for heating purposes. Typically, the amount of heat transferred into the cooling oil during the combustion process is equal to or only slightly greater than the amount of heat required for maintaining an advantageous operating temperature in the cooling oil, which is used simultaneously as a lubricating oil.

It is a primary object of this invention to provide a piston in which the thermal flow in the radial direction toward the cylinder liner is relatively low, and the thermal flow in the axial direction of the piston is as great as possible.

A multiple piece piston of this invention would typically include a main body and a ring element secured to the top of the main body. The ring element forms the entire piston crown which surrounds a combustion chamber depression and it is preferably made of a material which has low thermal conductivity. The heat flow into the piston main body occurs mostly in the area of the combustion chamber depression which is located approximately in the middle of the piston. The piston main body is preferably made of a material which has high thermal conductivity so that the heat of combustion is rapidly conducted through the piston main body away from the combustion chamber. A cooling chamber is formed radially between the piston main body and a ring support area of the ring element whereby combustion heat dispersed radially is absorbed by the coolant circulating through in the cooling chamber without a substantial transfer of heat into the ring support area. The thermal flow thus occurs predominantly axially within the piston main body. The interior cavity of the piston main body, which faces the crank casing, is sprayed with cooling oil so that the heat flowing axially into the piston main body is transferred rapidly into the cooling oil without substantial transfer in the direction of the cylinder liner.

As illustrated, the axial height of the radially inner part of the ring element is approximately equal to the depth of the combustion chamber depression. Thus the walls of the combustion chamber depression formed exclusively by the ring element form a radial barrier to heat transfer which extends the full depth of the combustion chamber depression. The bottom of the combustion chamber depression formed in the upper end or head of the main body of the piston accommodates nearly all the heat transfer which produces a predominantly axial thermal flow within the piston main body.

The division plane defined by the juncture of the ring element with the piston main body is preferably disposed substantially at the transition between the perpendicular side wall of the combustion chamber depression and its curved base, and, when an omega-shaped combustion chamber is used, the raised apex of the base disposed on the combustion chamber axis, lies on the plane of division.

Other advantageous features of the invention are specified in the following claims and are described in detail in the following description of one embodiment of the invention.

BRIEF DESCRIPTION OF THE INVENTION

One embodiment of the invention is illustrated in the attached drawing showing a section of a multiple piece piston.

DETAILED DESCRIPTION OF THE INVENTION

The piston includes a main body 1 having an opening or internal cavity 2 adapted for connection to a connecting rod, not shown. The crown 15 of the piston facing the combustion chamber is provided with a combustion chamber depression 4 whose axis 4a is spaced at a fixed distance from the piston axis 1a and is parallel to the latter.

The piston crown 15 which presents the combustion chamber depression 4 is formed by a ring element 3 which is fastened tightly by cap screws 12 to the axially upper end of the piston main body 1 opposite the opening 2. The piston main body 1 includes bore holes through which the shaft of a cap screw 12 extends and the cap screw 12 is in threaded engagement and a threaded blind hole 14 in the ring element. In order to firmly secure the ring element 3 to the piston main body 1, a thrust washer 13 is placed between the head of the cap screw 12 and the piston main body 1. Although only a single cap screw is illustrated, it should be understood that a plurality of circumferentially spaced cap screws are provided to securely hold the ring element 3 in place.

The ring element 3, which forms the piston crown 15 surrounding the combustion chamber depression 4, extends axially the entire depth of the combustion chamber depression 4. The division plane 5 between the ring element 3 and the piston main body 1 is located near the bottom of the depression, preferably at the transition of the radially inner cylindrical wall 6 of the omega-shaped combustion chamber depression 4 with its dished base or bottom 7. The walls 6 of the omega-shaped combustion chamber depression are parallel to the piston axis 1a and to the combustion chamber depression axis 4a and are perpendicular to the division plane 5.

The ring element 3 forms, in addition, a fire wall 16 of the piston which extends axially outward of the division plane 5. In the single-component ring element 3 a cylindrical ring support area or part 10 connects to the fire wall 16 in which two axially spaced annular grooves 11 have been formed for accepting piston rings, not shown. The ring support area 10 and its annular grooves 11 are located axially beneath the division plane 5.

The ring element 3 and the piston main body 1 form therebetween a cooling chamber which is made up of two cooling chamber segments 8 and 9. Cooling chamber segment 8 extends—proceeding approximately at the division plane 5—axially into the ring element 3 in the direction of the upper end of the piston crown 15 whereby this ring-shaped cooling chamber segment 8 runs somewhat radially outward in the axial direction toward the outer circumferential edge 18 of the piston. This cooling chamber segment 8, which is shaped in the form of an annular groove extending upwardly into ring element 3, discharges into an annular channel in the form of the lower chamber segment 9 bordered at radially opposite sides by the piston main body 1 and the ring support area 10. The cooling chamber segment 9 extends mainly in the axial direction of the piston. The piston is preferably made of two metals with the ring element 3 being made of an iron material, preferably steel, i.e., of a material which exhibits low thermal conductivity, and the piston main body being made of a material which exhibits high thermal conductivity, preferably aluminum.

In this dual-metal piston, the heat of combustion flows at a very low rate via the ring element 3 into the cylinder liner 19 in which the piston slides. Such radial thermal flow is, in addition, reduced by cooling chambers 8 and 9 so the heat of combustion which is introduced into the ring element 3 can, for the most part, be transferred by the fluid which circulates in the cooling chambers. This results in a very minor radial thermal flow to the cylinder liner.

The heat of combustion in the combustion chamber base of combustion chamber depression 4 is transferred, for instance, by spraying the underside of the piston crown or base with cooling oil by means of an injection nozzle 17 disposed below the piston opening 2. This construction results in the major part of the heat of combustion flowing axially through the piston main body 1. The heat flowing in a radial direction is mainly transferred to the cooling oil in the cooling chambers 8 and 9.

In a piston constructed according to this invention, the heat transfer rate to the ring area 10 and the cylinder liner 19 surrounding the piston is very low and the rate of heat transfer to the cooling oil is relatively high, whereby the thermal energy of the heated cooling oil can be used for heating through the use of heat exchangers.

The contact surfaces at 20, 21, 22 between the piston main body 1 and the ring support element 3 are precisely finished to form good seals to avoid oil leaks. The radially contacting surfaces at 21 are designed to provide a press fit of the ring support area 10 on the main body 1. The lower end of the ring support part 10 abuts an upwardly facing shoulder 23 on the main body 1.

The oil drain is located in an appropriate groove 24 in the main body 1 beneath the shoulder 23 and is immediately adjacent to the latter, whereby a trouble-free drain-off of oil is guaranteed.

The embodiments of the invention in which an exclusive property or privilege is claimed are defined as follows:

1. A multiple piece piston for an internal combustion engine with an omega-shaped combustion chamber depression formed in the central part of the crown at the top of the piston and whose axis is parallel with the axis of said piston, said piston comprising:

a piston main body of material with high thermal conductivity including an upward facing dish-shaped surface on its upper end forming the bottom of said combustion chamber depression, a first axially upward facing annular surface at the top of said main body encircling said dish-shaped surface, a first radially outward facing cylindrical surface extending downwardly from the radially outer edge of said first annular surface a distance at least as great as the distance between said first annular surface and the top of said piston, a second axially upward facing annular surface extending radially outward from the lower end of said first cylindrical surface, a second radially outward facing cylindrical surface extending downward from the radially outer edge of said second annular surface a predetermined distance and a third axially upward facing annular surface extending radially outward from the bottom of said second cylindrical surface to the outer diameter of said piston main body, a ring element of material with low thermal conductivity forming the entire crown encircling the combustion chamber depression and including a radially inner cylindrical side wall which together with said dish-shaped surface of said main body defines said combustion chamber depression, the lower end of said radially inner cylindrical side wall presenting a downwardly facing annular surface complementary to and in abutment with said first annular surface thereby defining a division plane passing through said combustion chamber depression, a radially outer fire wall at the upper end of said ring and a ring support part extending axially downward from said fire wall having a radially inward facing cylindrical surface in radially outward spaced relation to said first cylindrical surface with its lower portion in radial sealing engagement with said second cylindrical surface on said main body part and a plurality of axially spaced piston ring grooves in said ring support part, said ring grooves being disposed below said division plane an annular cooling chamber including an upper segment in said ring element between said radially inner cylindrical wall and said fire wall and a lower segment extending downwardly from said upper segment between said ring support part and said first cylindrical surface, aligned axially extending holes in said radially inner cylindrical wall of said ring element and said main body, each aligned hole in said ring element being a threaded blind hole, and a cap screw extending through each aligned hole in said main body and threadedly engaging the aligned threaded hole in said ring element.

2. The piston of claim 1 wherein the axial height of said ring element at the combustion chamber depression is approximately equal to the axial depth of the combustion chamber depression.

3. The piston of claim 2 wherein said division plane is located in the transition of said cylindrical side wall with said dished bottom.

4. The piston of claim 3 wherein said ring element is made of steel.

5. The piston of claim 4 wherein said piston main body is made of aluminum.

6. The piston of claim 1 wherein said ring element is made of steel and said main body is made of aluminum.

* * * * *